Nov. 13, 1962 S. B. COLEMAN 3,064,236

SELECTIVE SIGNALING SYSTEM

Filed July 16, 1959 2 Sheets-Sheet 1

INVENTOR
S. B. COLEMAN
BY Roy M. Porter Jr.
ATTORNEY

Nov. 13, 1962 S. B. COLEMAN 3,064,236

SELECTIVE SIGNALING SYSTEM

Filed July 16, 1959

2 Sheets-Sheet 2

INVENTOR
S. B. COLEMAN
BY Roy M. Porter, Jr.
ATTORNEY 3,064,236

SELECTIVE SIGNALING SYSTEM

Sidney B. Coleman, North Andover, Mass., assignor to Bell Telephone Laboratories, Incorporated, New York, N.Y., a corporation of New York Filed July 16, 1959, Ser. No. 827,662
9 Claims. (Cl. 340—164)

Figure 1:
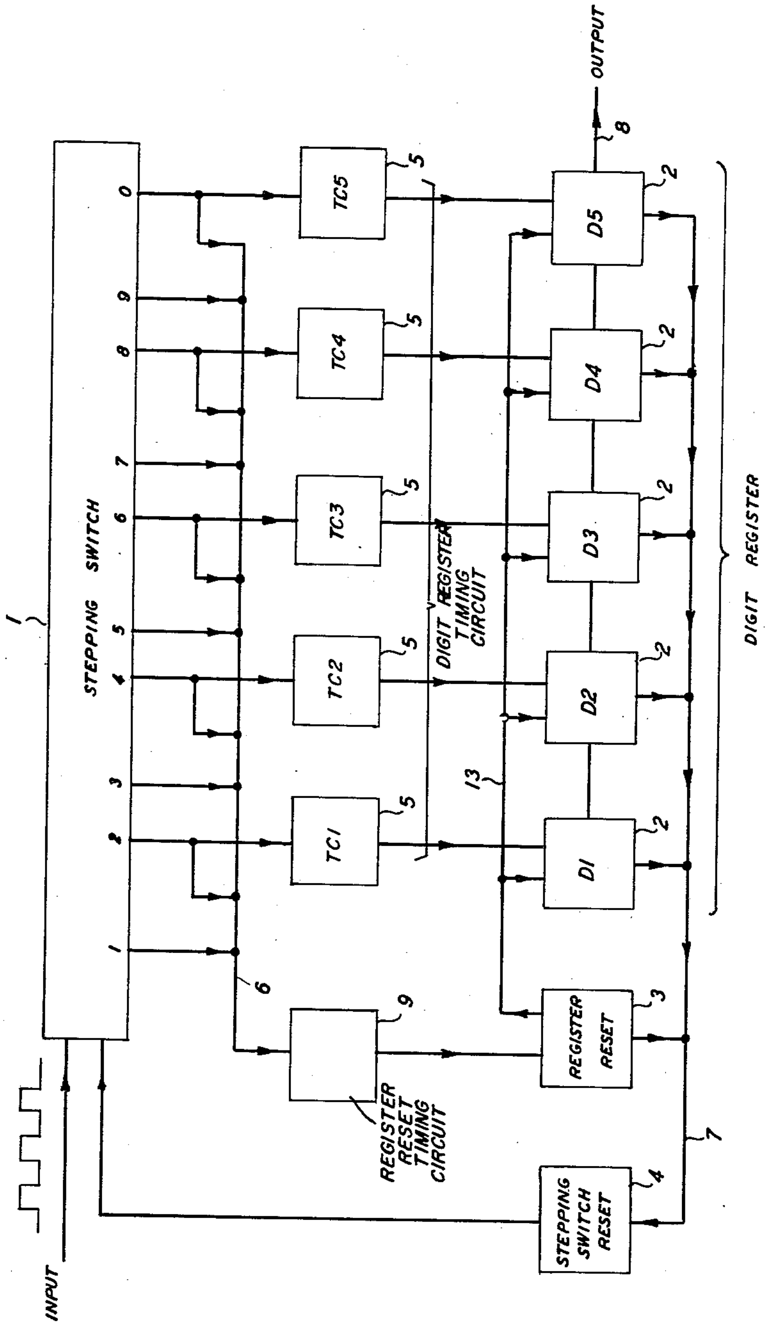

This invention relates generally to selective signaling systems. More particularly this invention relates to the provision of simple, compact, economical facilities whereby any one of a large number of mobile stations in a mobile telephone system can be selectively called without disturbing any of the other stations.

In one form, mobile telephone service is furnished through land radio stations connected to the wire telephone system. Since the number of radio channels available for this service is limited, it is necessary for a fairly large number of mobile stations to share the use of a single channel. In order that a mobile station may receive telephone calls, some means must be provided whereby the mobile service operator may call the desired station. In many radio systems, this is accomplished by providing at each station a loudspeaker which is in operation at all times, the desired station being called by voice. Such an arrangement has the disadvantage that the occupants of all the telephone-equipped stations hear all conversations on their channel. This is annoying and results in the reduction of privacy. Therefore, systems have been devised which use code analyzing and recognition circuits which enable the mobile service operator to ring a bell or cause a lamp to ignite at the desired station by dialing the station's assigned code or telephone number.

In another form, mobile telephone service is not dependent upon a central station. In such a system, each mobile station can call any other station without the necessity of requesting the central station operator to broadcast the assigned code number or telephone number of another mobile station to which communication is desired to be established. At all mobile stations in this system the receiving circuits must also analyze all call codes received and respond by actuating a local call signal such as a bell or signal light only when the call code assigned a specific receiving station is received.

As can be seen, regardless of the form of mobile telephone service, if selective signaling is to be employed, each receiver at each mobile station must employ a code analyzing and recognition circuit. This circuit analyzes the received pulse trains and if the digits (or more broadly integers if the assigned code is not based on the decimal system) represented by the received pulse trains and the sequence in which they are received correspond with the code number assigned to the receiving station, a bell or lamp is actuated. This notifies the operator of the called station or mobile station that the call code of that specific station has been received.

It is therefore an object of this invention to provide in the receiving equipment of each mobile station simple, reliable and economical code analyzing and recognition apparatus which will actuate a local call device such as a bell or signal lamp only when the received call code is that code which is assigned to that station.

One of the major disadvantages of the code analyzing and recognition apparatus now utilized in the art is that this equipment is very expensive, physically large and requires a considerable amount of power from the radio receiver and provides relatively few number combinations.

Therefore in accordance with the invention there is provided a compact, lightweight and inexpensive code analyzing and recognition apparatus which has the advantage of being easily adaptable to substantially unlimited code capacity.

Figure 2:
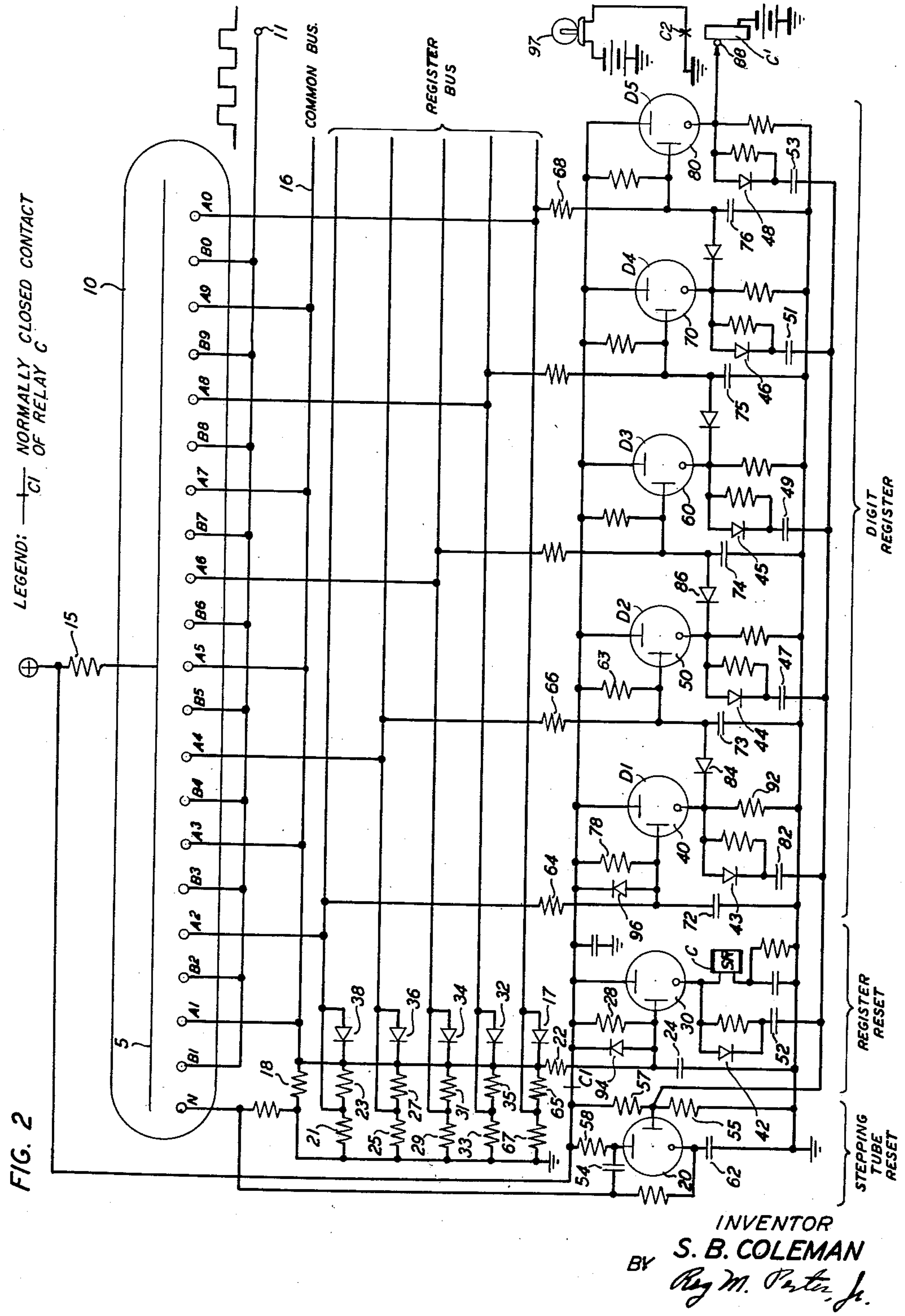

The advantages and features of the present invention will become apparent upon reference to the following description taken in conjunction with the drawings wherein:

FIG. 1 is a block diagram representing the essential elements of one embodiment of the invention; and FIG. 2 is a detailed schematic diagram illustrating one embodiment of the invention.

FIG. 1 illustrates one embodiment of the invention in block diagram form and represents the essential elements of a five-digit code analyzing and recognition circuit. The invention is in no way limited by the digit capacity illustrated in FIG. 1 and this will become quite apparent from the description which follows. Only two circuits are required to perform the reset functions and only one memory circuit or stage is required for each digit within the capacity of the code analyzing and recognition circuit. This means that the capacity of the code analyzing and recognition circuit utilizing ten digits may be increased one decimal place by the mere insertion of one more stage or memory circuit. The code analyzing and recognition circuit illustrated in block diagram form in FIG. 1 is designed to provide an output voltage which can be utilized to actuate a bell or a lamp to notify the station operator only when a code corresponding to an assigned code is received. Each digit is represented by a pulse train such as those produced by a conventional telephone dial. Although the assigned code may consist of any desired combination of digits, the digit 1 can be used in the code analyzing and recognition circuit illustrated as a reset pulse to insure that all code analyzing and recognition circuits of a system are in the required initial condition before dialing starts.

As previously stated the essential elements of the code analyzing and recognition circuit are shown in block diagram form in FIG. 1. Block 1 represents a counter or stepping switch with ten outputs corresponding to the digits 1 through 0. The counter or stepping switch represented by block 1 will be sequentially stepped from output to output starting with an initial position, not shown, and will come to rest (or provide a steady output) at the output corresponding to the digit which is represented by the incoming pulse train. The blocks 2, comprising circuits or stages D1 through D5, represent a five-digit register arranged so that each register input can be actuated by any desired stepping switch output. The digit register circuit 2 remembers the digits which have been received by the system. However, the digit register circuit will only remember the digits which appear in the assigned code number and also only if these digits are received in the proper sequence. Block 3 represents the register reset circuit which performs the function of resetting the digit register circuit 2, and to activate the stepping switch reset circuit illustrated as block 4. The register reset circuit 3 is itself activated whenever any unassigned digit is received or when an assigned digit is received in the wrong sequence. Block 4 represents the stepping switch reset circuit and is activated whenever the register reset circuit 3 or any of the digit register stages D1 through D5 are activated and performs the function of returning the stepping switch 1 to its normal or initial position. The blocks 5 represent timing circuits associated with the digit register 2 which discriminate between interpulse intervals and intervals between pulse trains. The arrows connected to line 6 represent circuit paths through which the register reset circuit 3 is activated whenever the output of stepping switch 1, which is responsive to the received input pulse trains, does not actuate the digit register circuit 2; as when an unassigned digit is received or an assigned digit is received in the wrong sequence.

The arrows connected to line 7 represent paths through which a signal generated by actuation of the digit register 2 or the register reset 3 is sent to activate the stepping switch reset circuit 4. The output terminal 8 may be connected to any output signal device such as a lamp or bell or a relay controlling such a device. An output signal appears at terminal 8 only when the assigned code is received. The line 13 represents the common line to each stage of the digit register 2 over which the digit register 2 is cleared of any memory when the register reset 3 operates.

In the code analyzing and recognition circuit illustrated in FIG. 1, assigned outputs, i.e., outputs which represent digits which occur in the assigned code of the illustrated station, are connected to the digit register circuit 2 in a sequential order corresponding to the order of the appearance of the digits in the assigned code. This is accomplished by connecting the first circuit in the digit register circuit to the output of the stepping switch 1 corresponding to the first digit in the assigned code, which in this case is shown as the output 2. The second circuit D2 in the digit register circuit 2 is connected to the output corresponding to the second digit in the assigned code, which in this case is shown as the output 4. D3 is connected to the output 6 of the stepping switch 1 and D4 is connected to the output 8 of the stepping switch 1 and D5 is connected to the output 0 of the stepping switch 1. Thus the assigned code of the illustrated station is 24680. Any other digit sequence can be used as is obvious and the assigned code is merely illustrative.

Circuit D2 of the digit register will not be actuated unless D1 has been previously actuated and also circuits D3, D4 and D5 will not be actuated unless the immediately preceding circuit of the digit register has been actuated. Any received digit not a part of the assigned code or a part of such code, but not in the assigned sequence, accordingly causes the register reset circuit 3 to operate, thereby wiping out any digits that may have previously been registered. Outputs can be assigned in any desired combination. For example, if a five-digit register is provided, the code may consist of any five-digit number (except those containing the digit 1 for the particular embodiment illustrated).

As has been stated the circuits illustrated as the blocks labeled 5 are timing circuits and as such function to inhibit activation of the associated circuit in the digit register circuit as the pulses of the input pulse train cause the stepping switch 1 to be sequentially stepped to the output corresponding to the digit of the pulse code being received. This simply means that the digit register circuits will not be actuated during the brief interpulse interval during which the stepping switch 1 is connected to each output as it is sequentially stepped along.

The stagess D1 through D5 of the digit register are all timed to operate only on outputs from the stepping switch 1 which have the time duration of an interdigital space and in any case before the register reset stage 3 can operate. Block 9 represents the timing circuit associated with the register reset circuit 3 and functions to inhibit the activation of the register reset circuit 3 for a time longer than that required to activate any of circuits D1 through D5 of the digit register circuit 2. Also, as will be seen later, the timing circuit 9 inhibits the activation of the register reset circuit sufficiently to allow any of the digit register circuits 2 to activate the stepping switch reset circuit 4 and it in return resets the stepping switch 1. Each time a stage D1 through D5 of the digit register circuit operates, its output, which is connected through the line 7, operates the stepping switch reset circuit 4 and also causes the next succeeding digit register stage to be in a condition for activation. The stepping switch reset circuit 4 is also operated by the register reset circuit 3. As has been indicated, whenever the stepping switch reset circuit 4 operates, the stepping switch 1 is returned to its starting position. Only a correct digit will cause a register stage of the digit register to operate. An incorrect digit will always cause the register reset to clear the register. Therefore, the final stage of the register can be actuated only if the assigned code is received in the proper sequence.

Referring now to FIG. 2, there is illustrated in a diagrammatic form a cold cathode gaseous discharge device 10 having an initial or normal conducting path existing between the cathode N and the anode 5 and which may be of any type known in the art as, for example, the type disclosed in Patent No. 2,575,370 granted November 20, 1951 to M. A. Townsend. The mode and manner of operation of these cold cathode gaseous discharge devices is well known in the art and is also fully explained in the aforementioned patent. It is therefore sufficient to state herein that each pulse in the pulse train, which appears at the input terminal 11 of this code analyzing and recognition circuit, will cause the conducting path in tube 10 to be stepped from the normal or initial cathode N step-by-step through successive A type cathodes. Thus, a pulse train comprising six pulses applied to terminal 11 would cause the conduction path in the tube 10 to be successively stepped to the right from the initial conducting path to the sixth position which would be the cathode labeled A6.

FIG. 2 also contains a digit register circuit which corresponds to the digit register circuit 2 of FIG. 1 and comprises cold cathode triode tubes 40, 50, 60, 70 and 80 and the components associated therewith. The digit register circuit is arranged so that each individual circuit associated with the cold cathode triodes can be actuated by any desired stepping switch output. In FIG. 2 the cold cathode triode 30 and its associated circuit components correspond to the register reset circuit 3 of FIG. 1. As was previously stated the register reset circuit clears the digit register circuit whenever it is activated. That is, any information stored in the register circuit is erased and the digit register circuit is returned to its initial operating condition. In FIG. 2 the stepping tube reset circuit corresponding to block 4 of FIG. 1 comprises the cold cathode triode 20 and its associated circuit components. The function of the stepping tube reset circuit is to return the conduction path in the tube 10 to the normal position or conduction through cathode N. The oher components illustrated in FIG. 2 can be best described by following the operation of the code analyzing and recognition circuit as it receives incoming pulse trains representing dialed digits. The cold cathode triodes of the reset circuits and the digit register circuit can be of any appropriate type known in the art, such as the 443A tube. However, it should be noted that the tube type 443A is only an example of what may be used and the cold cathode triodes must be chosen in view of the battery potential available and also the cold cathode stepping tube which is chosen. All of these matters are considered to be within the province of good design once the invention is disclosed.

Initially tube 10 is conducting through the path between the anode 5 and the initial or normal cathode N. The cold cathode triodes of FIG. 2 are initially all nonconducting. Input terminal 11 receives a series of pulses representing a pulse code assigned to one of the mobile stations of the system. This pulse code could originate at the transmitting station in the form of alternate transmission of two different frequencies under the control of the operator's dial. However, this is not necessary as any means or method of transmitting a pulse code will do just as well. Therefore, preceding terminal No. 11 there must be provided apparatus appropriate to the type of pulse transmission which is utilized at the operator's station. This equipment after operation on the received signal ultimately transmits to the input terminal 11 a series of voltage pulses or pulse trains corresponding to a code number of a station desired to be called.

As can be seen in FIG. 2, the unassigned stepping switch outputs, which correspond to digits which are not present in the code number assigned to the illustrated party, are connected to line 16, which may be termed a common bus. If the incoming pulse train represents a digit which is not a part of the code number of the code assigned the party or station illustrated in FIG. 2 and what will be termed the "assigned code," the stepping switch 10 will be stepped from its initial position to the output corresponding to the digit which the incoming pulse train represents, and, therefore, conduction will occur from positive battery indicated, through resistor 15, which is chosen so as to allow only one conduction path to exist in tube 10, the anode side of tube 10, the A type cathode corresponding to the unassigned digit, the common bus 16, and the common bus resistor 18. Therefore, a signal will also appear across the resistor 22 and capacitor 24. As can be seen, capacitor 24 is connected to the starting electrode of the cold cathode tube 30.

Initially and for design reasons, the starter electrode of the cold cathode tube 30 is biased to within a few volts of the ignition potential of tube 30 through a path from the positive side of the battery, indicated as a plus sign, the normally closed contacts C1 of relay C, through resistor 28, resistor 22 and resistor 18 to ground. Therefore, when an activating signal appears on capacitor 24, the potential on the starting electrodes of tube 30 is increased and the tube 30 fires. The positive battery potential indicates as a plus sign is not sufficient to ignite the tubes 30 through 80. However, the battery potential is high enough to maintain conduction once any of these tubes has been ignited.

The potential across capacitor 24 cannot change instantly and therefore a period of time is required before the potential on capacitor 24 can change sufficiently to cause tube 30 to ignite. As has been previously stated, this time constant corresponding to the timing circuit 9 of FIG. 1 is chosen such that the pulse outputs from the stepping switch 10, as it steps from output to output, do not actuate the register reset circuit. The diodes 32, 34, 36, 38 and 17 cause unassigned outputs, connected to the common line 16, to be applied only to the register reset circuit and as will be seen later the same diodes permit assigned outputs of the tube 10 to be applied both to the register reset circuit and the associated digit register circuit without interaction with any of the other digit register stages. Whenever the register reset circuit tube 30, ignites, relay C is operated and the normally closed contacts C1 are opened momentarily thereby removing the battery from any of the digit register circuits and also from the register reset circuit itself. This will cause all the circuits in the digit register and the register reset circuit to return to the initial operating condition. Also when tube 30 ignites a signal is transmitted to the starter electrode of tube 20 of the stepping switch reset circuit from the cathode of tube 30 through the diode 42, capacitor 52 and resistor 55 to ground. This signal causes tube 20 to ignite. In order to prevent this signal, which occurs whenever the register reset or any stage of the digit register ignites, from being attenuated by the obvious shunting paths provided by the other cathode circuits before reaching the stepping tube reset circuit, the isolating diodes 42, 43, 44, 45, 46 and 48 are provided. Also the blocking capacitors 52, 82, 47, 49, 51 and 53 are utilized to isolate the circuits they are associated with from the bias voltage across resistor 55.

Firing of the stepping tube reset stage, which comprises tube 20 and its associated components, causes a large negative pulse, due to discharge of the capacitor 54 through the tube 20 to be applied to the normal cathode N of the stepping tube 10. This will thereby cause the potential between the normal cathode N and the anode 5 of tube 10, to be so large as to take over conduction from any other path which may be existing in the tube 10 at the time. Thus, tube 10 is returned to its initial starting position. By a proper choice of resistor 58 and capacitor 62 the voltage at the plate of tube 20 will, after a short time, drop below the sustaining value and thereby extinguish itself preparatory to the next operation.

Now let us assume that the first received pulse train corresponds to a digit which is part of the code number assigned the illustrated station. According to FIG. 2 this digit would be 2 since the second output of the tube 10 is connected to the first stage of the digit register circuit which comprises the cold cathode triode tube 40. For design purposes the starter electrode of tube 40 is biased within a few volts of the ignition potential of the tube 40 from the plus side of the battery through the normally closed contacts C1 of relay C, resistor 78, resistor 64, diode 38 and resistor 18. Also the time constant of the circuit associated with capacitor 72 is sufficiently long to prevent tube 40 from igniting when tube 10 is merely stepping from cathode to cathode in response to the individual pulses of an incoming pulse train. However, the time constant of the circuit associated with capacitor 72 is short enough to cause conduction of tube 40 before the register reset circuit can operate.

If, as has been assumed, the digit 2 has been received and tube 10 has come to rest during the interdigital space with the conduction path existing between anode 5 and cathode A2, tube 40 will be ignited. It also must be seen that the assigned output of the tube 10 is also connected to the register reset circuit through diode 38 and resistor 22. Therefore, a signal is being applied simultaneously to the register reset circuit and the first stage of the digit register circuit. As has been explained, the time constant of the digit register stage is such as to cause the stage in the digit register to ignite before the register reset circuit can operate. As soon as the first stage of the digit register circuit D1, which is associated with the second output of the stepping tube 10, ignites, a signal is sent to the stepping tube reset circuit through diode 43 and capacitor 82 thus causing the stepping tube reset circuit to return the tube 10 to its normal conducting path through anode 5 and cathode N. Therefore the signal which was being applied to the register reset circuit and the first stage D1 of the digit register is removed. This places another requirement upon the timing circuits or time constant circuits and that is that the register stage and the stepping tube reset circuit must cause the conducting path in tube 10 to be returned to its starting or initial path before the register reset can operate. Timing circuits or time constant circuits are well known in the art and their values can readily be selected to be appropriate to the operation just described and therefore it is believed that specific design values need not be stated.

When the first stage of the digit register circuit operates it performs another function, and that is to back-bias the diode 84 which is connected between the cathode of the first stage of digit register circuit D1 and the starter electrode of the second stage of the digit register circuit D2, thereby enabling the second stage of the digit register circuit to operate if the next received pulse train corresponds to the output to which the second stage of the digit register circuit is connected.

If now the second pulse train of the code being received corresponds to the digit 4, tube 50 will ignite, and, in the same manner as the first stage D1, will enable the third stage D3 of the digit register circuit, and also will send a signal to ignite the stepping tube reset circuit and return the conduction path of the tube 10 to the normal position. If the third train of pulses corresponds to the digit 6, which is connected to the third stage D3 of the digit register circuit, the third stage D3 will ignite and the same process will be repeated. Thus, if the pulse trains of the received code call correspond to the code number assigned the illustrated station, tube 80 will finally ignite and an output voltage will appear at the output terminal 88. This output voltage can be utilized to activate a bell or a lamp or any desired method of communicating to the called party that his code number has been dialed. For example, the output voltage appearing at terminal 88 is shown as activating a relay C' such that the normally open or make contact C2 associated therewith closes and completes a direct-current path from the lamp 97 to ground resulting in a visual calling indication.

If at any time during the period of the reception of the code, a pulse train representing a digit of the assigned code is received in other than the proper sequence, the digit register circuit connected to the output of tube 10 corresponding to this digit will not be ignited because a shunt path will exist through the diode which connects the cathode of the preceding stage and the starter electrode of the stage sought to be activated. Therefore the potential on the starter electrode will not rise sufficiently to activate the tube and hence the stage. For example, if the digit 4 is received before the first stage D1 of the digit register is activated, a conduction path will occur from the positive battery, resistor 15, the anode of tube 10, through the cathode A4, the resistor 66, the diode 84 and the resistor 92. This path will provide a bias on the starting electrode of tube 50 of insufficient value to ignite the tube 50 and therefore tube 50 will not operate. Instead the register reset, which is also connected to the A4 cathode, operates and resets the stepping tube.

In the above-described embodiment of the invention there are several conditions which may occur which affect the operation of the register stage starter electrodes. Under normal initial standby conditions the first stage of the digit register circuit comprising tube 40 and the register reset circuit comprising tube 30 have their starter electrodes biased to within a few volts of the breakdown potential of the tube with which they are associated. This biasing path for the register reset circuit has already been described. The biasing path for the first stage of the digit register circuit is from positive battery through the normally closed contact C1 of relay C, resistor 78, resistor 64 through diode 38 and resistor 18 to ground. When the digit register is in its initial condition the bias potential applied to the remainder of the stages of the digit register is derived from the path from the positive battery, through the normally closed contacts C1 of relay C, through the resistor connected from the starter electrode to the anode of each stage, such as resistor 63, and through the shunting path comprising the previously mentioned shunting diodes, such as diode 84, and then through the cathode resistor of the preceding stage to ground such as resistor 92. These biasing paths provide a bias on the starter electrodes which is well below the breakdown value of these cold cathode triodes.

If an unassigned digit is received, that is, a digit which does not appear in the assigned code number, a conduction path occurs through the cathode associated with the unassigned digit, the common bus 16 and the resistor 18 and, hence, the potential of the common bus 16 rises and therefore the starter electrode potential of the enabled stage in the digit register would also be expected to rise, providing the danger of a false firing of the enabled stage. Enabled stage refers to that stage in the digit register which can be activated if the next pulse train received corresponds thereto. As is readily seen when an unassigned digit is received, the potential of the common bus 16 must necessarily be above the potential of the cathodes of the assigned stepping tube outputs in order to fire the reset stage. This potential on the common bus 16 must not be allowed to act upon the starter circuit of the first or other enabled register stage since this could result in the false firing of the enabled register stage. Isolation of the digit register stages is provided by the diodes 17, 32, 34, 36 and 38. Resistors 21, 25, 29, 33, and 67 are also utilized to prevent or check the rise of potential at the starter electrode of the enabled stage of the digit register. The value of these resistors must be chosen such that the potential which is reached by the starter electrode of the enabled stage is well below the breakdown potential of the tube of the enabled stage during the period of time the unassigned digit is being received.

The stepping tube 10 may also be affected by the potential on the common bus 16 or, in other words, the voltage drop across resistor 18. A necessary condition for the proper stepping of stepping tubes, such as the class of tubes which could be utilized in the invention, is that the conduction path or arc within the tube after it has been transferred onto a stepping cathode (any of the B cathodes), by the negative-going portion of the signal pulse must transfer the conduction path to the next succeeding output cathode (the A cathodes) on the following positive-going portion of the signal pulse. Negative-going does not necessarily mean negative with respect to ground. It simply means the potential from the anode 5 to the stepping cathodes, the B cathodes, is increasing. The nature of the tube may be such that a double transfer could occur if the next succeeding output cathode potential is substantially higher than that of another cathode present in tube 10, for example, the second in succession. There therefore would exist the possibility that the arc or conduction path could be advanced two steps by one signal pulse. The resistors connected across the last-mentioned diodes, that being resistors 23, 27, 31, 35 and 65, apply a sufficient portion of the brief common bus potential, which occurs during the stepping operation, to the assigned cathodes, so that none of the output cathodes will momentarily offer the low potential necessary for a double transfer to take place.

When the register reset circuit or any of the stages of the digit register circuit are ignited, the potential on the starting electrode may stand well above the initial breakdown value of the tube and therefore this potential, which is due to the charge on the timing capacitor, that being capacitor 24 for the register reset circuit and capacitors 72, 73, 74, 75 and 76 for the digit register circuit, must be dissipated while the anode circuits are open due to the opening of contacts C1 of relay C, or the stages, which were conducting, will immediately refire or ignite when the anode supply is restored. In all except the register reset circuit and the first stage of the digit register circuit the enabling diodes, such as 84 and 86, serve this function. Therefore, diodes 94 and 96 are provided for the register reset circuit and the first stage of the digit register circuit respectively to perform this function.

When two or more of the stages of the digit register are assigned to the same stepping tube output, that is to say for a number such as 22222, the first activated stage of the digit register circuit causes the stepping tube reset circuit to operate and return the stepping tube 10 to its initial or normal conducting path. This must occur before the succeeding stage which is then enabled due to the back-biasing of the diode connecting the cathode of the activated stage to the starter electrode of the next succeeding stage, can ignite. In the above-mentioned example, that is, where all the stages of the digit register are connected to the same output of the stepping tube, only the first stage will operate when the pulse train representing digit 2 is received, since the shunt diodes such as diodes 84 and 86 will prevent the potential on the starting electrodes from rising to the point where conduction of their associated tubes is initiated. When the first stage fires, the diode 84 is back-biased and the capacitor 73 begins to charge toward the ignition potential. Therefore, this time constant or the period of time that is required for capacitor 73 to charge to the ignition potential of tube 50 must be longer than the period of time required for the stepping tube reset stage to return the stepping switch to its initial or normal path. With these and the other requirements of the timing circuits stated, it is believed that one skilled in the art would have little trouble in the proper choice of circuit component values. It may be noted that no timing circuit, as such, is used in connection with the starter electrode of the stepping tube reset tube 20. Thus its operation follows instantaneously the operation of a register or register reset stage, whereas a succeeding register stage is subject to the time delay mentioned. The stepping tube output pulse is therefore terminated long before the succeeding register stage can ignite.

What is claimed is:

1. Dial pulse code number recognition apparatus to respond to a preassigned code number comprising a plurality of integers represented by a like plurality of pulse groups, the number of pulses in each group corresponding to the numerical value of its corresponding integer, the pulse groups being arranged in the same sequential order as the corresponding integers of said code number, said apparatus comprising a first means for counting each group of pulses, a second means connected to said first means and responsive thereto for forwarding an indication whenever the group counted by said first means represents an integer of said code and when the group counted represents an integer in the correct sequential position in said code, a third means connected to said first means and responsive for removing any indication which said second means has previously forwarded whenever the group counted represents an integer which is not a part of said code or an integer received in the improper sequential position of said integer in said code, a fourth means responsive to the operation of either of said second means or said third means for returning said first means to its initial condition for counting the next group of pulses, and call signal means responsive to said second means when said second means has forwarded said indication a number of positions corresponding to the number of integers in said code number to furnish an indication that the preassigned code has been received.

2. A code analyzing and recognition circuit comprising an input signal consisting of a group of electrical impulses representing elements of a code, a gaseous conduction device having a plurality of electrodes including an initial electrode and a common electrode, each of said plurality of electrodes and said common electrode defining a distinct conductive path, said device being responsive to said series of groups of electrical impulses to advance said conduction path therein commencing with said initial electrode step-by-step between said common electrode and successive ones of said plurality of electrodes, a digit register connected to preselected ones of said plurality of electrodes, a first timing circuit associated with said digit register for inhibiting activation of said digit register during intervals between impulses of said groups of impulses, said digit register being operable during intervals between groups of impulses if said conductive path in said gaseous conductive device includes a selected one of said plurality of electrodes, a register reset circuit connected to each of said plurality of electrodes except said initial electrode, a second timing circuit associated with said register reset for inhibiting activation of said register reset for a period of time greater than said first timing circuit, said register reset being operable during intervals between groups of impulses to reset said digit register to its initial operating condition if said digit register has not been activated during the interval between said groups of impulses, a stepping switch reset circuit connected to said gaseous conduction device, said register reset, and said digit register and responsive to the activation of either said register reset or digit register during the interval between said groups of impulses to cause said gaseous conduction device to return to the initial conduction path including said initial electrode, said digit register upon activation enabling said digit register to be activated during the next interval between groups of impulses if said conductive path in said gaseous conductive device includes the next selected one of said plurality of electrodes.

3. A code analyzing and recognition circuit comprising an input signal consisting of groups of electrical impulses representing elements of a code, a stepping switch defining a plurality of distinct conductive paths including an initial conductive path, said stepping switch being responsive to said series of groups of electrical impulses to advance the conduction path therein step-by-step between successive ones of said plurality of conductive paths, a digit register connected to preselected ones of said plurality of conductive paths, a first timing circuit associated with said digit register for inhibiting activation of said digit register during intervals between impulses of said groups of impulses, said digit register being operable during intervals between groups of impulses if said conductive path in said stepping switch includes a selected one of said conductive paths, a register reset circuit connected to each of said plurality of conductive paths except said initial path, a second timing circuit associated with said register reset for inhibiting activation of said register reset for a period of time greater than the period of time that the first timing circuit inhibits said digit register, said register reset being operable during intervals between groups of impulses to reset both said register reset and said digit register to its initial operating condition when said digit register has not been activated during the interval between said groups of impulses, a stepping switch reset circuit connected to said stepping switch, said register reset, and said digit register, being responsive to the activation of either said register reset or digit register during the interval between said groups of impulses to cause said stepping switch to return to the initial conducting path and to cause itself to be returned to its initial operating condition, said digit register upon activation enabling said digit register to be activated during the next interval between groups of impulses if said conductive path and said gaseous conductive device includes the next selected one of said plurality of electrodes.

4. A code analyzing and recognition circuit comprising an input signal consisting of groups of electrical impulses representing elements of a code, a gaseous conduction device having a plurality of electrodes including an initial electrode and a common electrode, each of said plurality of electrodes and said common electrode defining a distinct conductive path, said device being responsive to said series of groups of electrical impulses commencing with said initial electrode to advance said conduction path therein step-by-step between said common electrodes and successive ones of said plurality of electrodes, a digit register circuit comprising a plurality of stages, each stage representing an element of a preassigned code and each stage arranged in sequential order corresponding to the order of appearance of the element in said preassigned code, said stages of said digit register being connected to selected ones of said plurality of electrodes which represents the assigned elements of the preassigned code, a first timing circuit associated with said digit register for inhibiting activation of said digit register during intervals between impulses of said groups of impulses, said digit register being operable during intervals between groups of impulses, if said conductive path and said gaseous conductive device includes one of said selected ones of said plurality of electrodes and if said conductive path represents an element of said preassigned code and said element appears in the proper sequential order, said digit register upon activation enabling the next stage in said digit register to be activated during the next inerval beween groups of impulses if said conductive path and said gaseous conductive device includes the path to which said next stage in said digit register is connected, and call means operable when all the stages of said digit register circuit have been enabled to cause an indication that the preassigned code has been received.

5. The apparatus of claim 4 and a register reset circuit connected to each of said plurality of electrodes except said initial electrode, said register reset being operable during intervals between groups of impulses to reset said digit register to its initial operating conditions if said digit register has not been activated during the interval between said groups of impulses.

6. Apparatus as in claim 5 and a stepping switch reset circuit connected to said gaseous conduction device, said register reset, and said digit register, being responsive to the activation of either said register reset or digit register during the interval between said groups of impulses to cause said gaseous conduction device to return to the initial conduction path including said initial electrode.

7. Dial pulse code number recognition apparatus to respond to a preassigned code number comprising a plurality of integers represented by a like plurality of pulse groups, the number of pulses in each group corresponding to the numerical value of its corresponding integer, the pulse groups being arranged in the same sequential order as the corresponding integers of said code number, said apparatus comprising a gaseous conduction device having a plurality of electrodes including an initial electrode and a common electrode, each of said plurality of electrodes and said common electrode defining a distinct conductive path, said device being responsive to said plurality of pulse groups commencing with said initial electrode to advance said conduction path therein step-by-step between said common electrode and successive ones of said plurality of electrodes, a digit register comprising a plurality of stages connected to selected ones of said plurality of electrodes, a timing circuit associated with each stage of said digit register for inhibiting activation of said digit register during intervals between pulses in each group, said digit register being operable during intervals between pulse groups if said conductive path in said gaseous conductive device includes a selected one of said plurality of electrodes, a first register reset circuit connected to each of said plurality of electrodes except said initial electrode, a second timing circuit associated with said register reset for inhibiting activation of said register reset for a period of time greater than the period of time that said first timing circuit inhibits its associated stage in said digit register, said register reset being operable during intervals between pulse groups to reset said digit register to its initial operating condition if said digit register has not been activated during the interval between said pulse groups, a second reset circuit connected to the initial conducting electrode of said gaseous conduction device and responsive to the activation of either said register reset or digit register during the interval between said pulse groups to cause said gaseous conduction devices to conduct through its initial conduction path including said initial electrode, said digit register upon activation enabling the next stage in said digit register to be activated if the next received pulse group corresponds to an integer of the preassigned code number and if said integer is in the correct sequential position in said code, and call means operable only when each stage of said digit register has been activated to cause an indication that said preassigned code number has been received.

8. Dial pulse code number recognition apparatus to respond to a preassigned code number comprising a plurality of integers represented by a like plurality of pulse groups, the number of pulses in each group corresponding to the numerical value of its corresponding integer, the pulse groups being arranged in the same sequential order as the corresponding integers of said code number, said apparatus comprising a first means for counting each group of pulses, a second means connected to said first means and responsive thereto for forwarding an indication whenever the group counted corresponds to an integer of said code and only when said integer is received in the proper sequential position of said integer in said code, third means connected to said first means and responsive for causing any indication forwarded by said second means to be removed whenever the group counted represents an integer which is not a part of the code or an integer which is received in the improper sequential position, and call signal means responsive to said second means for furnishing an indication that the preassigned code has been received when the latter has forwarded the indication the number of positions forward corresponding to the number of integers in said code number.

9. The apparatus of claim 8 and fourth means connected to said second means and said third means and responsive to the activation of either said second means or said third means for applying a resetting pulse to said first means to restore said first means to its initial position in readiness for counting the next successive group of pulses.

References Cited in the file of this patent

UNITED STATES PATENTS

| | | |
|---|---|---|
| 2,648,831 | Vroom | Aug. 11, 1953 |
| 2,929,048 | Berger | Mar. 15, 1960 |